(12) United States Patent
Guo et al.

(10) Patent No.: US 10,410,326 B2
(45) Date of Patent: Sep. 10, 2019

(54) IMAGE ANTI-ALIASING SYSTEM

(71) Applicant: Institute of Automation Chinese Academy of Sciences, Beijing (CN)

(72) Inventors: Ruoshan Guo, Beijing (CN); Rui Han, Beijing (CN); Renjun Tang, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 208 days.

(21) Appl. No.: 15/557,081

(22) PCT Filed: Apr. 16, 2015

(86) PCT No.: PCT/CN2015/076720
§ 371 (c)(1),
(2) Date: Sep. 9, 2017

(87) PCT Pub. No.: WO2016/165097
PCT Pub. Date: Oct. 20, 2016

(65) Prior Publication Data
US 2018/0061013 A1    Mar. 1, 2018

(51) Int. Cl.
*G06K 9/40* (2006.01)
*G06T 5/00* (2006.01)
(Continued)

(52) U.S. Cl.
CPC .............. *G06T 5/002* (2013.01); *G06T 5/20* (2013.01); *G06T 7/13* (2017.01); *G06T 11/60* (2013.01); *G06T 2207/20192* (2013.01)

(58) Field of Classification Search
CPC ........... G06T 11/60; G06T 2207/20192; G06T 5/002; G06T 5/20; G06T 7/13
See application file for complete search history.

(56) References Cited

U.S. PATENT DOCUMENTS

2002/0126900 A1   9/2002  Kim
2003/0206667 A1  11/2003  Wang et al.
(Continued)

FOREIGN PATENT DOCUMENTS

CN   101790069 A   7/2010
CN   103093418 A   5/2013
(Continued)

OTHER PUBLICATIONS

PCT/CN2015/076720 International Search Report.

*Primary Examiner* — Xin Jia
(74) *Attorney, Agent, or Firm* — Howard IP Law, PLLC; Jeremy Howard (57) ABSTRACT

The present invention discloses an image anti-aliasing system, which comprises an edge detection unit, a directional filter, a low-angle directional filter, a directional filtering fusion unit and a result fusion unit; the edge detection unit outputs the edge direction and edge confidence according to an input image, the directional filter outputs a directional filtering result based on the input image and the edge direction, the low-angle directional filter outputs a low-angle directional filtering result according to the input image and the edge direction; the directional filtering fusion unit weights and combines the result output from the directional filter and the result output from the low-angle directional filter according to the edge direction, and outputs a result of weighted combination of two directional filtering results; the result fusion unit outputs an optimized image according to the edge confidence, the input image and the result of the directional filtering fusion unit. The present invention can well handle directional filtering in any direction and it has good effect to low-angle aliasing.

10 Claims, 5 Drawing Sheets

(51) Int. Cl.
　　　*G06T 7/13*　　　(2017.01)
　　　*G06T 5/20*　　　(2006.01)
　　　*G06T 11/60*　　(2006.01)

(56) References Cited

U.S. PATENT DOCUMENTS

| | | | | |
|---|---|---|---|---|
| 2008/0199099 A1* | 8/2008 | Michel | ............ | G06T 3/403 |
| | | | | 382/260 |
| 2010/0054622 A1* | 3/2010 | Adams | ............ | G06T 3/403 |
| | | | | 382/269 |
| 2010/0225646 A1* | 9/2010 | Wei | ............ | G06T 3/00 |
| | | | | 345/419 |
| 2012/0155783 A1* | 6/2012 | Huang | ............ | G06T 5/002 |
| | | | | 382/260 |
| 2015/0170336 A1* | 6/2015 | Lapointe | ............ | G06T 3/403 |
| | | | | 382/298 |
| 2017/0302910 A1* | 10/2017 | Richards | ............ | G06T 7/593 |

FOREIGN PATENT DOCUMENTS

| | | |
|---|---|---|
| CN | 103500435 A | 1/2014 |
| CN | 104794692 A | 7/2015 |

* cited by examiner

IMAGE ANTI-ALIASING SYSTEM

TECHNICAL FIELD

The present invention relates to the technical field of image and video processing, in particular to the field of anti-aliasing for images, videos and graphics.

BACKGROUND

Processing used in image and video processing, such as scaling and de-interlacing, will bring about an aliasing effect to edges of the images, that is, in the processed image, aliasing effect or jagginess occurs near edges that look straight in the source image. In graphics rendering, when processing a straight line, aliasing will occur in the rendered straight line if mishandled. When aliasing occurs in an image, it is necessary to remove the aliasing.

Figure 1:
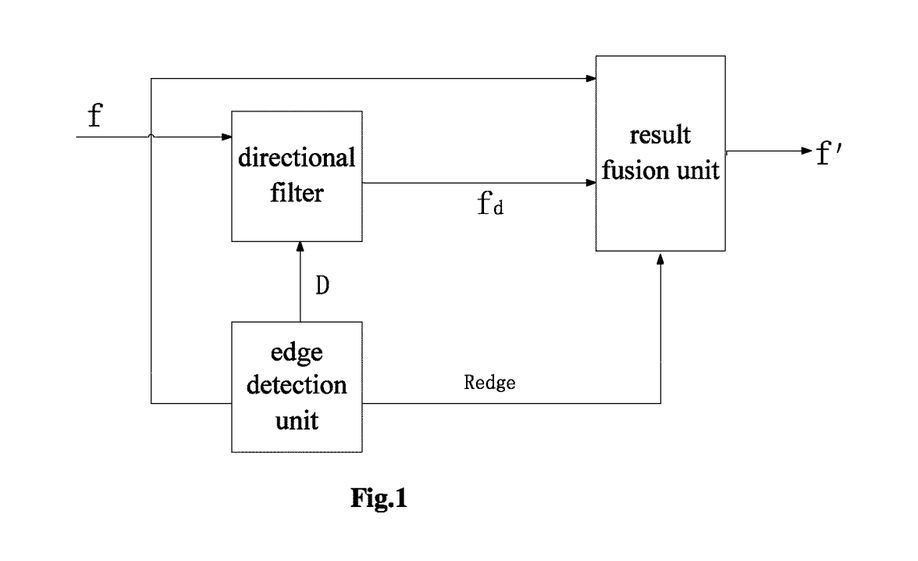
FIG. 1 is a block diagram of a conventional anti-aliasing system.

A conventional anti-aliasing system is as shown in FIG. 1, in which the edge of an image is detected, then a filter is selected from a group of directional filters according to the direction of the edge to perform filtering along the direction of the edge, and finally the source image and the directional filtering result are combined by means of the confidence level of the edge to output the final result. Such an anti-aliasing system has several disadvantages. The first disadvantage is that the direction is usually quantified into a limited number of directions, each direction corresponding to a filter along the direction, thus for directions that fall between the quantified directions, only the nearest quantified direction can be selected for filtering, or the results of filtering along several neighboring quantified directions are combined, and the accuracy is affected. The second disadvantage is that, when processing a low angle (i.e. an angle close to the horizontal direction) pixel whose edge direction is lower than the lowest angle among the quantified directions, aliasing occurred in said direction cannot be effectively handled. The third disadvantage is that, when processing a low angle (i.e. an angle close to the horizontal direction) pixel, pixels used for filtering are far away from one another, so mistakes are readily occur.

SUMMARY OF THE INVENTION

In order to solve the above technical problems, the present invention proposes an image anti-aliasing system, which can well process directional filtering for any direction and has good effect for low-angle aliasing.

An image anti-aliasing system provided by the present invention comprises: an edge detection unit, a directional filter and a result fusion unit; the edge detection unit outputs an edge direction and edge confidence according to an input image. The directional filter outputs a directional filtering result based on the input image and the edge direction. The result fusion unit outputs an optimized image based on the edge confidence, the input image and the directional filtering result. Said directional filter calculates, according to the edge direction of a pixel to befiltered, coordinates of intersection points of a line that goes through the pixel along the edge direction and horizontal scanning lines or vertical scanning lines neighboring the pixel, and interpolates temporary pixels at the intersection points by means of a one-dimensional interpolation method, then filters the pixel to be filtered by a one-dimensional filter using the temporary pixels along the edge direction and outputs the directional filtering result.

In order to realize better anti-aliasing effect, the image anti-aliasing system according to the present invention further comprises a low-angle directional filter and a directional filtering fusion unit. The low-angle directional filter outputs a low-angle directional filtering result according to the input image and the edge direction. The directional filtering fusion unit weights and combines the result output from the directional filter and the result output from the low-angle directional filter according to the edge direction, and outputs a result of weighted combination of the two directional filtering results. The result fusion unit outputs an optimized image according to the edge confidence, the input image and the result of the directional filtering fusion unit.

When the directional filter obtains the temporary pixels at the intersection points by calculating the coordinates of the intersection points of a line that goes through a pixel to be filtered along the edge direction and horizontal scanning lines neighboring the pixel, the low-angle directional filter calculates the coordinates of the intersection points of a line that goes through the pixel along the edge direction and vertical scanning lines neighboring the pixel, and interpolates temporary pixels at the intersection points by means of a one-dimensional interpolation method, then filters the pixel to be filtered by a one-dimensional filter using the temporary pixels along the edge direction and outputs the low-angle directional filtering result.

When the directional filter obtains the temporary pixels at the intersection points by calculating the coordinates of the intersection points of a line that goes through a pixel to be filtered along the edge direction and the vertical scanning lines neighboring the pixel, the low-angle directional filter calculates the coordinates of the intersection points of a line that goes through the pixel along the edge direction and the horizontal scanning lines neighboring the pixel, and interpolates temporary pixels at the intersection points by means of a one-dimensional interpolation method, then filters the pixel to be filtered by a one-dimensional filter using the temporary pixels along the edge direction and outputs the low-angle directional filtering result.

The present invention has the following advantageous effects:
(1) no direction quantization is performed, so aliasing in any direction can be handled;
(2) low-angle aliasing can be handled well, and the angle that can be handled may be arbitrarily close to the horizontal direction.

DETAILED DESCRIPTION OF THE INVENTION

For the purpose of having the object, technical solutions and advantages of the present invention more apparently for those skilled in the art, the present invention will be described in further detail below in conjunction with specific embodiments and with reference to the drawings.

Figure 2:
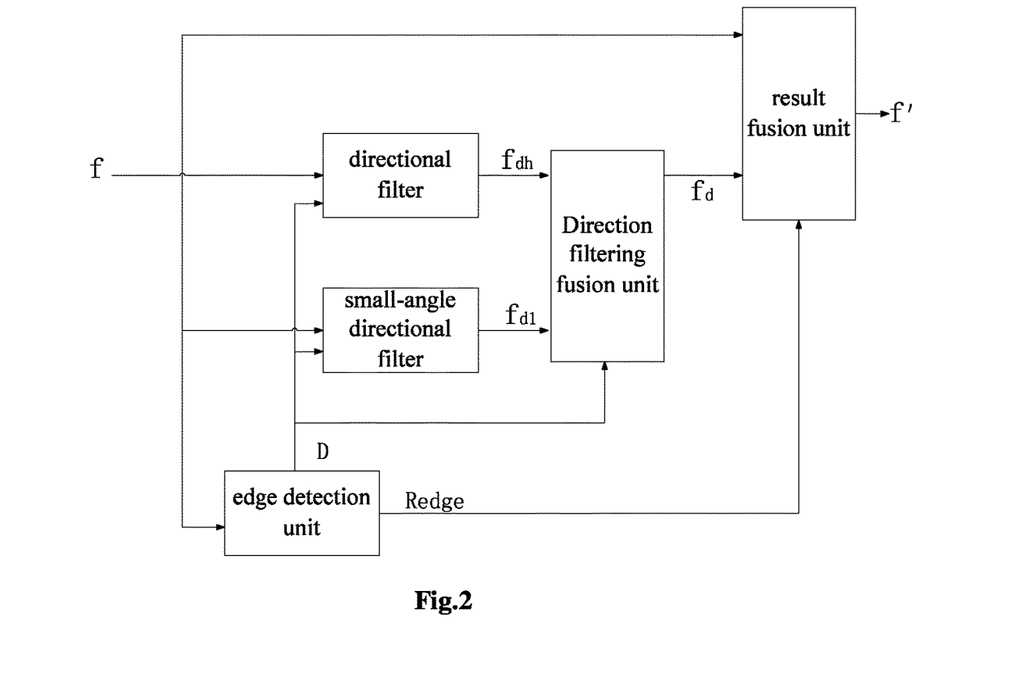
FIG. 2 is a block diagram of an image anti-aliasing system according to the present invention.

As shown in FIG. 2, the image anti-aliasing system in the present embodiment comprises an edge detection unit, a directional filter, a low-angle directional filter, a directional filtering fusion unit, and a result fusion unit. The edge detection unit outputs an edge direction D and an edge confidence $R_{edge}$ according to an input image f. The directional filter outputs a directional filtering result $f_{dh}$ based on the input image f and the edge direction D. The low-angle directional filter outputs a low-angle directional filtering result $f_{dl}$ based on the input image f and the edge direction D. The directional filtering fusion unit weights and combines the result $f_{dh}$ output from the directional filter and the result $f_{dl}$ output from the low-angle directional filter according to the edge direction D, and outputs a result $f_d$ of weighted combination of two directional filtering results. The result fusion unit outputs an optimized image f' according to the edge confidence $R_{edge}$, the input image f and the result $f_d$ of the directional filtering fusion unit.

Figure 3:
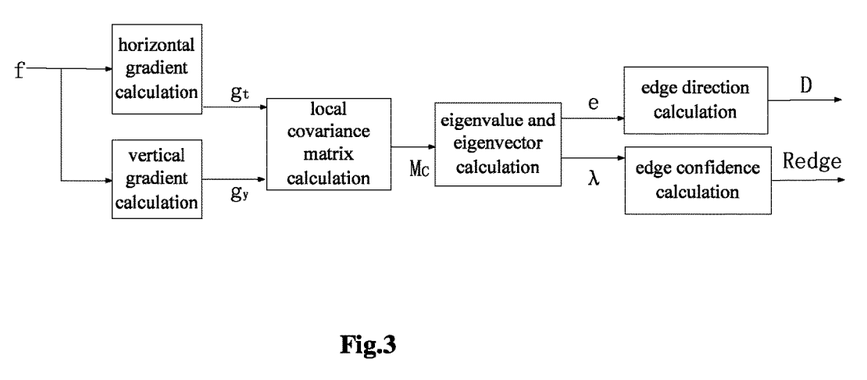
FIG. 3 is a block diagram of an edge detection unit according to the present invention.

As shown in FIG. 3, the edge detection unit comprises a horizontal gradient calculating module, a vertical gradient calculating module, a local covariance matrix calculating module, an eigenvalue and eigenvector calculating module, an edge direction calculating module, and an edge confidence calculating module. The horizontal gradient calculating module calculates a horizontal gradient $g_x$ of an image pixel according to the input image f. The vertical gradient calculating module calculates a vertical gradient $g_y$ of an image pixel according to the input image f. The local covariance matrix calculating module calculates a local covariance $M_c$ of a pixel according to the horizontal gradient $g_x$ and vertical gradient $g_y$ of the pixel. The eigenvalue and eigenvector calculating module calculates eigenvalues λ and eigenvectors e of the local covariance matrix of the pixel according to the local covariance $M_c$. The edge direction calculating module calculates an edge direction d of the pixel according to the eigenvectors. The edge confidence calculating module calculates the edge confidence $R_{edge}$ of the pixel according to the eigenvalues.

Wherein the horizontal gradient $g_x$ and vertical gradient $g_y$ can be obtained by using Sobel gradient operator or other gradient operators. The calculation formula for the local covariance $M_c$ is as shown by formula (1). Suppose that the window size for calculating the local covariance is $(2K+1)*(2N+1)$, then the pixel at $(i, j)$ has a local covariance of $$M_c(i,j) = \begin{pmatrix} \sum_{n=-N}^{N}\sum_{k=-K}^{K}(g_x(i+k,j+n))^2 & \sum_{n=-N}^{N}\sum_{k=-K}^{K}g_x(i+k,j+n)* \\ & g_y(i+k,j+n) \\ \sum_{n=-N}^{N}\sum_{k=-K}^{K}g_x(i+k,j+n)* & \sum_{n=-N}^{N}\sum_{k=-K}^{K}(g_y(i+k,j+n))^2 \\ g_y(i+k,j+n) & \end{pmatrix} \quad (1)$$

The eigenvalues of the covariance matrix Mc are $\lambda_1$ and $\lambda_2$, $\lambda_1 \geq \lambda_2$, the eigenvectors are $e_{\lambda 1}$ and $e_{\lambda 2}$. Then the edge direction D has the same direction with the eigenvector $e_{\lambda 2}$ associated with the smaller eigenvalue $\lambda_2$, as shown in formula (2)

$$D = e_{\lambda 2} \quad (2)$$

The confidence R of the edge direction is calculated according to formula (3), wherein Tr represents the trace of the matrix, and Det represents the determinant of the matrix.

$$R = \frac{\lambda_1}{\lambda_2} \approx \frac{Tr(M_c)}{Det(M_c)} \quad (3)$$

Figure 4:
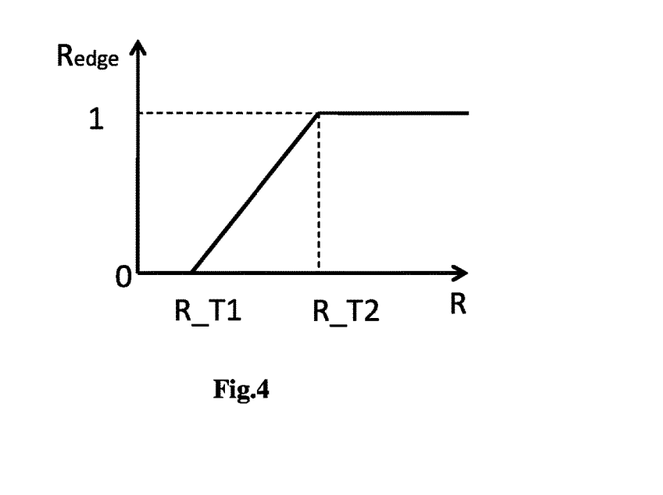
FIG. 4 is a schematic drawing of a curve for calculation of normalized edge confidence.

Calculation of the normalized edge confidence $R_{edge}$ is as shown in FIG. 4, and the formula thereof is as formula (4):

$$R_{edge} = \begin{cases} 1 & \text{if } R > R\_T2 \\ 0 & \text{if } R < R\_T1 \\ \frac{R - R\_T1}{R\_T2 - R\_T1} & \text{else} \end{cases} \quad (4)$$

wherein R_T1 and R_T2 are two preset thresholds.

The directional filter can achieve the corresponding filtering effect by using either the horizontal scanning lines in the adjacent domain or the vertical scanning lines in the adjacent domain, and in this embodiment, using of the horizontal scanning lines in the adjacent domain is described in detail. The directional filter calculates coordinates intersection points of a line that goes through the pixel to be filtered along the edge direction and horizontal scanning lines neighboring the pixel according to the edge direction D of the pixel to be filtered, and interpolates temporary pixels at the intersection points by means of a one-dimensional interpolation method, then filters the pixel to be filtered by a one-dimensional filter using temporary pixels along the edge direction and outputs a directional filtering result $f_{dh}$.

Figure 5:
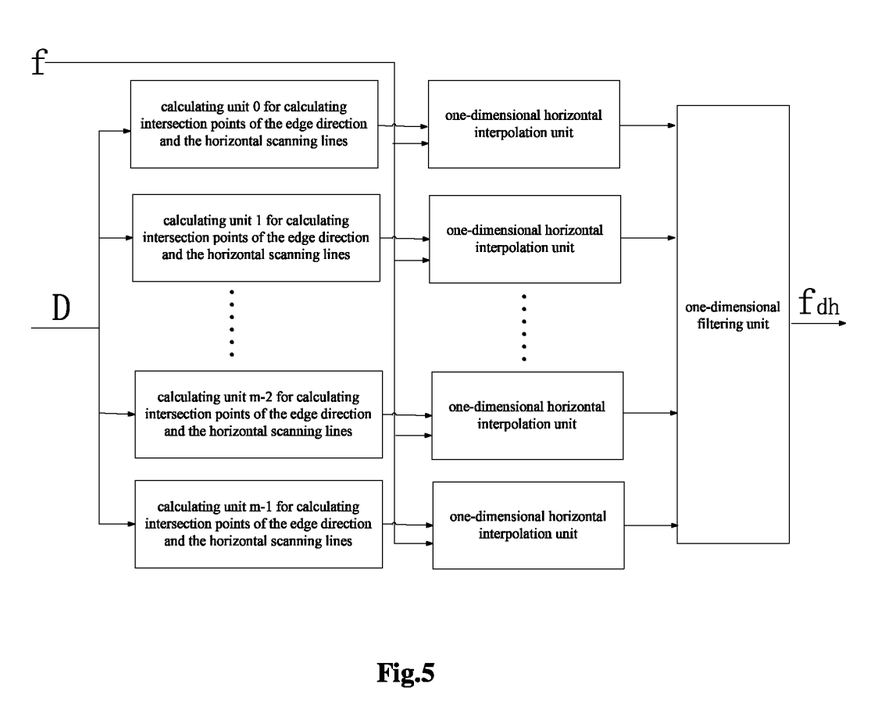
FIG. 5 is a schematic drawing of the structure of a directional filter according to the present invention.

To facilitate description and understanding, in the example taken in this embodiment, as shown in FIG. 5, there are 5 calculating units for calculating the intersection points of a line that goes through the pixel to be filtered along the edge direction and horizontal scanning lines neighboring the pixel.

Figure 6:
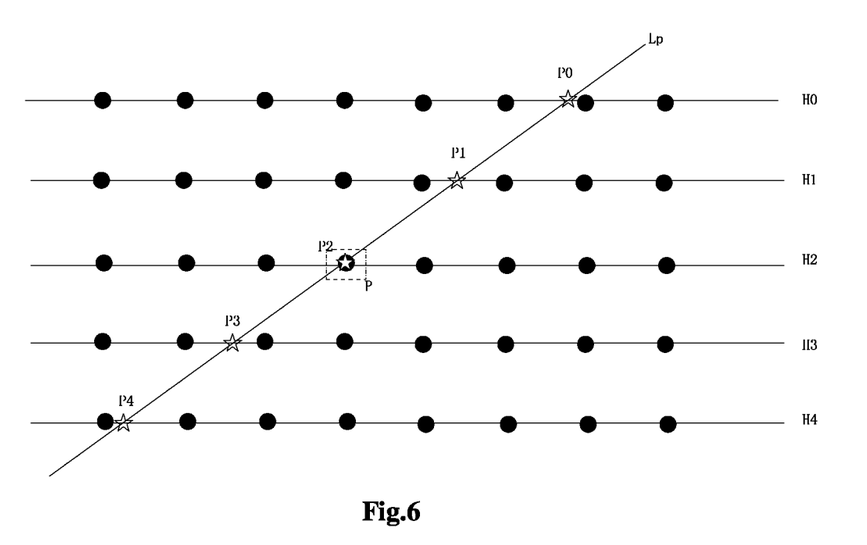
FIG. 6 is a schematic drawing of directional filtering according to the present invention.

FIG. 6 is a schematic drawing of directional filtering, wherein the black dots are original image pixels, P is the pixel to be filtered, and the coordinates of intersection points of a line Lp that goes through P along the edge direction and the horizontal scanning lines (H0, H1, H2, H3, H4 in FIG. 6) neighboring P are calculated according to the edge direction of the pixel P to be filtered, and temporary pixels (P0, P1, P2, P3, P4) at the intersection points, as indicated by the stars in FIG. 6, are interpolated by means of a horizontal interpolation method, then the pixel P is filtered by a one-dimensional filter using the temporary pixels along the edge direction to obtain the final directional filtering result.

As shown in FIG. 5, there are m calculating units (m=5 in this embodiment) for calculating intersection points of the edge direction and the horizontal scanning lines in the directional filter, wherein a calculating unit n (n=0, 1, . . . , m−1) calculates the coordinates of intersection point Pn of the edge direction and the horizontal scanning line Hn (n=0, 1, . . . , m−1), that is, the calculating unit 0 calculates the coordinates of intersection point P0 of the edge direction and the horizontal scanning line H0, the calculating unit 4 calculates the coordinates of intersection point P4 of the edge direction and the horizontal scanning line H4. The process of calculating the coordinates of the intersection points is as follows: suppose that the coordinates of the pixel P to be filtered are (i, j) and suppose that the input direction is D=[v1, v2]$^T$, then the coordinates (Pn.y, Pn, x) of the intersection points Pn (n=0, 1, 2, 3, 4) of a line Lp that goes through the pixel along the edge direction and the horizontal lines Hn (n=0, 1, 2, 3, 4) are as shown by formula (5)

$$\begin{cases} P0 \cdot y = i - 2; & P0 \cdot x = j + 2 * \frac{v1}{v2} \\ P1 \cdot y = i - 1; & P1 \cdot x = j + 1 * \frac{v1}{v2} \\ P2 \cdot y = i; & P2 \cdot x = j \\ P3 \cdot y = i + 1; & P3 \cdot x = j - 1 * \frac{v1}{v2} \\ P4 \cdot y = i + 2; & P4 \cdot x = j - 2 * \frac{v1}{v2} \end{cases} \quad (5)$$

As shown in FIG. 5, the one-dimensional interpolation unit in the directional filter receives image input as well as the intersection point coordinates from the calculating unit for calculating the intersection points of the edge direction and the horizontal scanning lines, and interpolates temporary pixel points Pn along the edge direction by using a one-dimensional interpolation method. The one-dimensional interpolation calculates the value of a point to be interpolated by using a weighted combination of several horizontally neighboring original pixels. The method for one-dimensional interpolation may be cubic interpolation, linear interpolation and poly-phase filter interpolation method.

As shown in FIG. 5, the one-dimensional filtering unit in the directional filter receives input of 5 temporary pixel points Pn (n=0, 1, 2, 3, 4) along the edge direction, and performs one-dimensional filtering using the 5 temporary pixel points to obtain the final filtering result $f_{dh}$, as shown by formula (6)

$$f_{dh} = \Sigma_{n=0}^{4} c_n * p_n \quad (6)$$

Wherein $c_n$ is a preset coefficient for filtering, which can be $c_n$=1/5, namely mean filtering.

Figure 7:
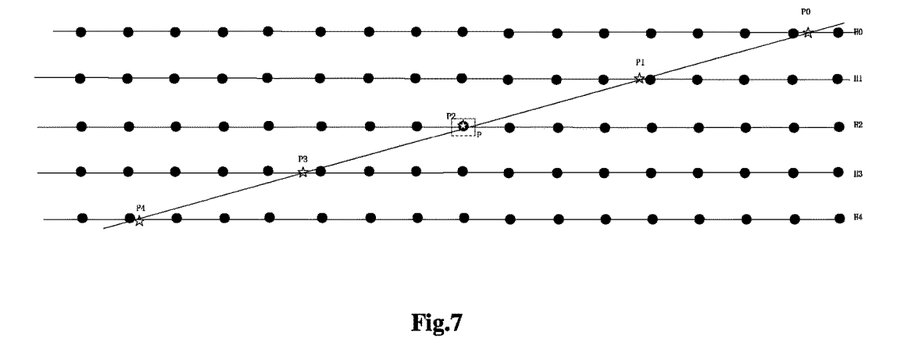
FIG. 7 is a schematic drawing of performing directional filtering at a low angle according to the present invention.

If the directional filter as shown in FIG. 6 is to be used for filtering images, when the edge direction of a pixel is of a low angle (i.e. close to a horizontal angle), the temporary pixel points P0, P1, P3, P4 along the edge direction are far away from the pixel P to be filtered, as shown in FIG. 7, the distant temporary pixels might no longer belong to the edge of the pixel to be filtered, so errors might be caused if pixels that are not at the edge also subject to the smoothing filtering.

Figure 8:
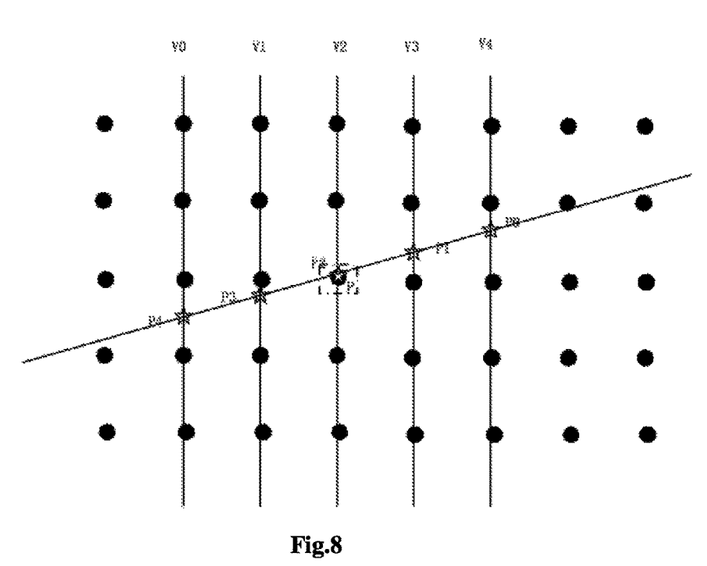
FIG. 8 is a schematic drawing of low-angle directional filtering according to the present invention.

To solve this problem, the present embodiment adopts a low-angle directional filtering method as shown in FIG. 8, coordinates of the intersection point of a line Lp that goes through the pixel to filtered along the edge direction and the vertical scanning lines (V0, V1, V2, V3, V4 as shown in FIG. 8) neighboring the pixel are calculated according to the edge direction D of the pixel P to be filtered, and temporary pixels P0, P1, P2, P3, P4 (as indicated by the stars in FIG. 8) at the intersection points are interpolated by means of a one-dimensional interpolation method, then the pixel to be filtered is filtered by a one-dimensional filter using the temporary pixels along the edge direction to output the low-angle directional filtering results $f_{dl}$.

Figure 9:
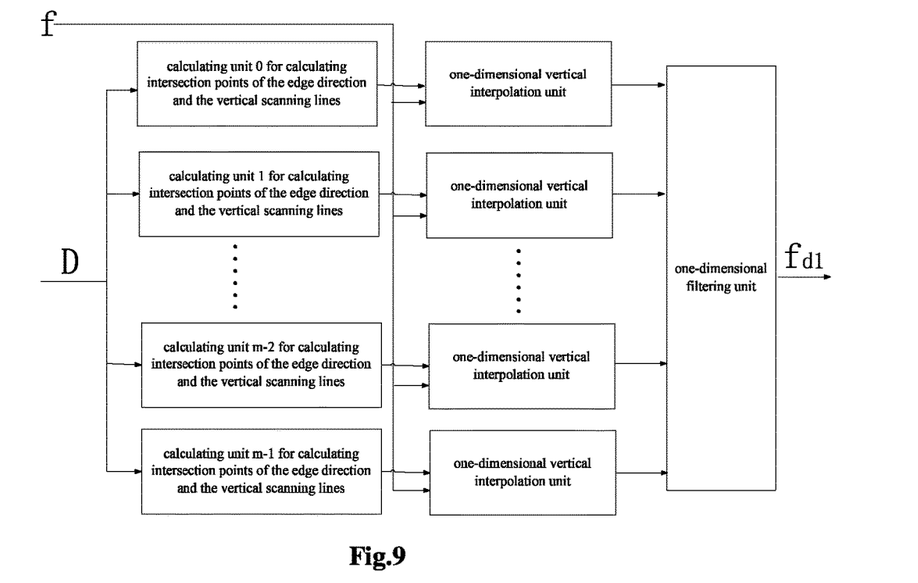
FIG. 9 is a schematic drawing of the structure of a low-angle directional filter according to the present invention.

FIG. 9 shows a block diagram of the low-angle directional filter unit, which receives input of an image f and a direction D calculated by the edge detection unit and outputs a directional filtering result $f_{dl}$. To facilitate description and understanding, in the example taken in this embodiment, there are 5 calculating units for calculating the intersection points of a line that goes through the pixel to be filtered along the edge direction and vertical scanning neighboring the pixel.

As shown in FIG. 9, there are m calculating units (m=5 in this embodiment) for calculating intersection points of the edge direction and the vertical scanning lines in the low-angle directional filter, wherein the calculating unit n (n=0, 1, . . . , m−1) calculates the coordinates of intersection point Pn of the edge direction and the vertical scanning line Vn (n=0, 1, . . . , m−1), that is, the calculating unit 0 calculates the coordinates of intersection point P0 of the edge direction and the vertical scanning line V0, the calculating unit 4 calculates the coordinates of intersection point P4 of the edge direction and the vertical scanning line V4. The process of calculating the coordinates of the intersection points is as follows: suppose that the coordinates of the pixel P to be filtered are (i, j) and suppose that the input direction is D=[v1,v2]$^T$, then the coordinates (Pn.y, Pn, x) of the intersection points Pn (n=0, 1, 2, 3, 4) of a line Lp that goes through the pixel along the edge direction and the vertical scanning lines Vn (n=0, 1, 2, 3, 4) are as shown by formula (7)

$$\begin{cases} P0 \cdot y = i - 2 * \frac{v2}{v1}; & P0 \cdot x = j + 2 \\ P1 \cdot y = i - 1 * \frac{v2}{v1}; & P1 \cdot x = j + 1 \\ P2 \cdot y = i; & P2 \cdot x = j \\ P3 \cdot y = i + 1 * \frac{v2}{v1}; & P3 \cdot x = j - 1 \\ P4 \cdot y = i + 2 * \frac{v2}{v1}; & P4 \cdot x = j - 2 \end{cases} \quad (7)$$

As shown in FIG. 9, the one-dimensional interpolation unit in the low-angle directional filter receives image input as well as the intersection point coordinates from the calculating unit for calculating the intersection points of the edge direction and the vertical scanning lines, and interpolates temporary pixel points Pn at the intersection points by using a one-dimensional interpolation method. The one-dimensional interpolation calculates the value of the point to be interpolated by using a weighted combination of several vertically neighboring original pixels. The method for one-dimensional interpolation may be cubic interpolation, linear interpolation and poly-phase filter interpolation method.

As shown in FIG. 9, the one-dimensional filtering unit in the low-angle directional filter receives input of 5 temporary pixel points Pn (n=0, 1, 2, 3, 4) along the edge direction, and performs one-dimensional filtering using the 5 temporary pixel points to obtain the final filtering result $f_{dh}$, which is as shown by formula (8)

$$f_{dl}=\Sigma_{n=0}^{4}c_{n}*p_{n} \qquad (8)$$

wherein $c_n$ is a preset coefficient for filtering, which can be $c_n=1/5$, namely mean filtering.

Figure 10:
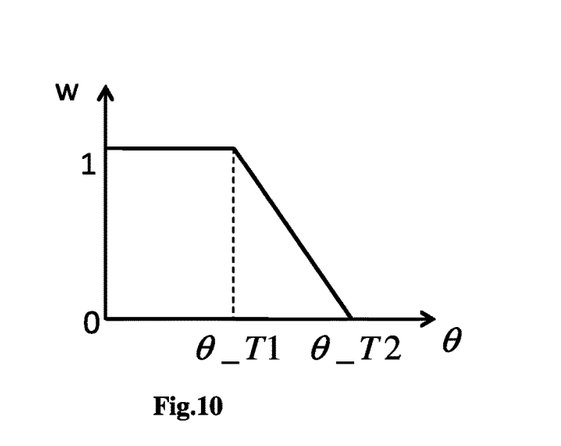
FIG. 10 is a schematic drawing of a curve for calculation of a mixing weight for two directional filters in the present invention.

The directional filtering fusion unit in the image anti-aliasing system as shown in FIG. 2 receives input $f_{dh}$ of the directional filter and input $f_{dl}$ of the low-angle directional filter, as well as input of the edge direction $D=[v1,v2]^T$, v1 represents a horizontal component of the direction vector, v2 represents a vertical component of the direction vector. A weighted combination is performed according to the angle of the edge direction, as shown by formula (9), wherein w is the weight for mixing $$f_d=(1-w)*f_{dh}+w*f_{dl} \qquad (9)$$

Wherein calculation of the weight is as shown in FIG. 10, and the calculation formula is as shown by formula (10)

$$w = \begin{cases} 1 & \text{if } \theta < \theta\_T1 \\ 0 & \text{if } \theta > \theta\_T2 \\ \frac{\theta\_T2 - \theta}{\theta\_T2 - \theta\_T1} & \text{else} \end{cases} \qquad (10)$$

wherein θ is an angle corresponding to the edge direction D, θ_T1 and θ_T2 are two preset thresholds. The calculation formula for the angle θ corresponding to the edge direction D is as shown by formula (11)

$$\theta = \arctan\frac{v2}{v1} \qquad (11)$$

The result fusion unit receives the image input f and the directional filtering fusion result $f_d$ as well as the edge confidence $R_{edge}$, and performs a weighted fusion of $f_d$ and f according to the edge confidence, as shown by formula (12):

$$f_d=(1-R_{edge})*f+R_{edge}*f_d \qquad (12)$$

What is claimed is:

1. An image anti-aliasing system comprising: an edge detection unit, a directional filter and a result fusion unit; the edge detection unit outputs an edge direction and edge confidence according to an input image, the directional filter outputs a directional filtering result based on the input image and the edge direction, the result fusion unit outputs an optimized image based on the edge confidence, the input image and the directional filtering result, characterized in that said directional filter calculates, according to the edge direction of a pixel to be interpolated, coordinates of intersection points of a line that goes through the pixel along the edge direction and horizontal scanning lines or vertical scanning lines in an adjacent domain, and interpolates temporary pixels at the intersection points by means of a one-dimensional interpolation method, then filters each of the temporary pixels along the edge direction by using a filter to output direction filtering results, wherein the image anti-aliasing system further comprises: a small-angle direction filter and a direction filtering fusion unit; the small-angle direction filter outputs a small-angle direction filtering result according to the input image and the edge direction of the pixel; the direction filtering fusion unit weights and combines the result output from the direction filter and the result output from the small-angle direction filter according to the edge direction of the pixel, and outputs a result of weighted combination of direction filtering; the result fusion unit outputs an optimized image according to the edge confidence of the pixel, the input image and the result of weighted combination of direction filtering;

when the direction filter obtains the temporary pixels at the intersection points by calculating the coordinates of the intersection points of a line through a pixel to be interpolated and along the edge direction and horizontal scanning lines in the adjacent domain, the small-angle direction filter calculates the coordinates of the intersection points of a line through the pixel and along the edge direction and vertical scanning lines in the adjacent domain according to the edge direction of the pixel to be interpolated, and interpolates temporary pixels at the intersection points by means of a one-dimensional interpolation method, then filters each of the temporary pixels along the edge direction by using the one-dimensional filter to output small-angle direction filtering results;

when the direction filter obtains the temporary pixels at the intersection points by calculating the coordinates of the intersection points of a line through a pixel to be interpolated and along the edge direction and the vertical scanning lines in the adjacent domain, the small-angle direction filter calculates the coordinates of the intersection points of a line through the pixel and along the edge direction and the horizontal scanning lines in the adjacent domain according to the edge direction of the pixel to be interpolated, and interpolates temporary pixels at the intersection points by means of a one-dimensional interpolation method, then filters each of the temporary pixels in the edge direction by using the one-dimensional filter to output small-angle direction filtering results.

2. The image anti-aliasing system as claimed in claim 1, characterized in that the edge detection unit comprises a horizontal gradient calculating module, a vertical gradient calculating module, a local covariance matrix calculating module, an eigenvalue and eigenvector calculating module, an edge direction calculating module, and an edge confidence calculating module; the horizontal gradient calculating module calculates a horizontal gradient of an image pixel according to the input image, the vertical gradient calculating module calculates a vertical gradient of an image pixel according to the input image, the local covariance matrix calculating module calculates a local covariance of a pixel according to the horizontal gradient and vertical gradient of the pixel, the eigenvalue and eigenvector calculating module calculates eigenvalues and eigenvector of the local covariance matrix of the pixel according to the local covariance, the edge direction calculating module calculates an edge direction of the pixel according to the eigenvalue, and the edge confidence calculating module calculates the edge confidence of the pixel according to the eigenvector.

3. The image anti-aliasing system as claimed in claim 2, characterized in that the calculation formula for the local covariance is:

$$M_c(i,j) = \begin{pmatrix} \sum_{n=-N}^{N}\sum_{k=-K}^{K}(g_x(i+k,j+n))^2 & \sum_{n=-N}^{N}\sum_{k=-K}^{K}g_x(i+k,j+n)* \\ & g_y(i+k,j+n) \\ \sum_{n=-N}^{N}\sum_{k=-K}^{K}g_x(i+k,j+n)* & \sum_{n=-N}^{N}\sum_{k=-K}^{K}(g_y(i+k,j+n))^2 \\ g_y(i+k,j+n) & \end{pmatrix}$$

wherein a window size of the local covariance is $(2K+1)*(2N+1)$, $M_c(i,j)$ is the local covariance of a pixel whose coordinates are $(i,j)$, $g_x$ is the horizontal gradient of the pixel, $g_y$ is the vertical gradient of the pixel;

the formula for calculating the edge direction is $D=e_{\lambda,2}$, wherein D is the edge direction, and $e_{\lambda,2}$ is an eigenvector corresponding to the smaller eigenvalue of the covariable matrix Mc;

the formula for calculating the edge confidence is $$R_{edge} = \begin{cases} 1 & \text{if } R > R\_T2 \\ 0 & \text{if } R < R\_T1 \\ \frac{R-R\_T1}{R\_T2-R\_T1} & \text{else} \end{cases}$$

wherein $R_{edge}$ is a normalized edge direction confidence, R_T1 and R_T2 are two preset thresholds, R is the edge direction confidence, wherein $$R = \frac{\lambda_1}{\lambda_2}, \lambda_1$$

and $\lambda_2$ are two eignvalues of the covariance matrix $M_c(i,j)$, and $\lambda_1 \geq \lambda_2$.

4. The image anti-aliasing system as claimed in claim 3, characterized in that the one-dimensional interpolation method comprises a cubic interpolation method, a linear interpolation method or a multi-phase filter interpolation method.

5. The image anti-aliasing system as claimed in claim 4, characterized in that the formula for calculating the coordinates of the intersection points of a line that goes through the pixel to be filtered along the edge direction and the horizontal scanning lines neighboring the pixel is:

$$\begin{cases} Pn-m\cdot y = i-m; & Pn-m\cdot x = j+m*\frac{v1}{v2} \\ \vdots \\ Pn-2\cdot y = i-2; & Pn-2\cdot x = j+2*\frac{v1}{v2} \\ Pn-1\cdot y = i-1; & Pn-1\cdot x = j+1*\frac{v1}{v2} \\ Pn\cdot y = i; & Pn\cdot x = j \\ Pn+1\cdot y = i+1; & Pn+1\cdot x = j-1*\frac{v1}{v2} \\ Pn+2\cdot y = i+2; & Pn+2\cdot x = j-2*\frac{v1}{v2} \\ \vdots \\ Pn+m\cdot y = i-m; & Pn+m\cdot x = j-m*\frac{v1}{v2} \end{cases}$$

Wherein (Pn.y,Pn,x) is the intersection point of the edge direction of the pixel P to be filtered at coordinates (i, j) and the horizontal scanning lines, m is a natural number greater than or equal to 2, v1 represents the horizontal component of an edge direction vector, v2 represents the vertical component of the edge direction vector.

6. The image anti-aliasing system as claimed in claim 4, characterized in that the formula for calculating the coordinates of the intersection point of a line that goes through the pixel to be filtered along the edge direction and the vertical scanning lines neighboring the pixel is:

$$\begin{cases} Pn-m\cdot y = i-m*\frac{v1}{v2}; & Pn-m\cdot x = j+m \\ \vdots \\ Pn-2\cdot y = i-2*\frac{v1}{v2}; & Pn-2\cdot x = j+2 \\ Pn-1\cdot y = i-1*\frac{v1}{v2}; & Pn-1\cdot x = j+1 \\ Pn\cdot y = i; & Pn\cdot x = j \\ Pn+1\cdot y = i+1*\frac{v1}{v2}; & Pn+1\cdot x = j-1 \\ Pn+2\cdot y = i+2*\frac{v1}{v2}; & Pn+2\cdot x = j-2 \\ \vdots \\ Pn+m\cdot y = i+m*\frac{v1}{v2}; & Pn+m\cdot x = j-m \end{cases}$$

wherein (Pn.y,Pn,x) is the intersection point of the edge direction of the pixel P to be filtered at coordinate (i, j) and the vertical scanning lines, m is a natural number greater than or equal to 2, v1 represents the horizontal component of an edge direction vector, v2 represents the vertical component of the edge direction vector.

7. The image anti-aliasing system as claimed in claim 5, characterized in that the filter for filtering the pixel to be filtered by using the temporary pixels is a one-dimensional filter.

8. The image anti-aliasing system as claimed in claim 7, characterized in that the result of weighted combination of directional filterings is $f_d=(1-w)*f_{dh}+w*f_{dl}$, wherein $f_d$ is the result of weighted combination of two directional filtering results, w is the weight for weighed combination, $f_{dh}$ is the directional filtering result, $f_{dl}$ is the low-angle directional filtering result.

9. The image anti-aliasing system as claimed in claim 8, characterized in that the formula for calculating the weight w for weighted combination in the directional filtering fusion unit is:

$$w = \begin{cases} 1 & \text{if } \theta < \theta\_T1 \\ 0 & \text{if } \theta > \theta\_T2 \\ \frac{\theta\_T2-\theta}{\theta\_T2-\theta\_T1} & \text{else} \end{cases}$$

wherein θ is an angle corresponding to the edge direction D, θ_T1 and θ_T2 are two preset thresholds.

10. The image anti-aliasing system as claimed in claim 9, characterized in that the formula for weighted fusion to get the optimized images is $$f' = (1-R_{edge})*f + R_{edge}*f_d$$

wherein f is the optimized image, $R_{edge}$ is the normalized edge direction confidence, f is the input image, $f_d$ is the result of the directional filtering fusion unit.

* * * * *

UNITED STATES PATENT AND TRADEMARK OFFICE
CERTIFICATE OF CORRECTION

PATENT NO. : 10,410,326 B2  
APPLICATION NO. : 15/557081  
DATED : September 10, 2019  
INVENTOR(S) : Ruoshan Guo et al.

Page 1 of 1

It is certified that error appears in the above-identified patent and that said Letters Patent is hereby corrected as shown below:

On the Title Page

(73) Assignee should read:
Beijing Smartlogic Technology Ltd., Yancun Town (CN)

Signed and Sealed this
Eighth Day of October, 2019

Andrei Iancu
*Director of the United States Patent and Trademark Office*